United States Patent [19]

Karlsson

[11] 4,227,560
[45] Oct. 14, 1980

[54] LOCK NUT
[75] Inventor: Bertil Karlsson, Eskilstuna, Sweden
[73] Assignee: Ingenjörsfirman Percy Blanck AB, Lidköping, Sweden
[21] Appl. No.: 854,498
[22] Filed: Nov. 23, 1977
[30] Foreign Application Priority Data Dec. 2, 1976 [SE] Sweden .............................. 7613515

[51] Int. Cl.² .............................................. F16B 39/04
[52] U.S. Cl. ......................................... 151/24; 85/1 SS
[58] Field of Search ............................ 151/24; 248/56; 85/1 SS

[56] References Cited

U.S. PATENT DOCUMENTS

| | | | |
|---|---|---|---|
| 215,836 | 5/1878 | Rhines | 151/24 |
| 602,120 | 4/1898 | Wright | 151/24 |
| 973,640 | 10/1910 | Dunkle et al. | 85/1 SS |
| 1,111,732 | 9/1914 | Breault | 151/24 |
| 1,340,602 | 5/1920 | Evans | 151/24 |
| 1,565,250 | 12/1925 | Bible | 151/24 |
| 2,355,900 | 8/1944 | Beede | 85/1 SS |
| 2,364,733 | 12/1944 | McCollum | 151/24 |
| 3,237,976 | 3/1966 | Campoli | 151/24 X |
| 4,056,252 | 11/1977 | Simon | 248/56 |

FOREIGN PATENT DOCUMENTS 1205811 9/1970 United Kingdom ................ 151/24

*Primary Examiner*—James T. McCall
*Attorney, Agent, or Firm*—Wenderoth, Lind & Ponack

[57] ABSTRACT

A locking pin is disposed in an oblique bore in a lock nut for engagement of the inner end of the pin against a threaded portion on which the nut is to be mounted, the inner end of the locking pin displaying a shape which fits the thread of the threaded portion. The common longitudinal axis of the bore and the locking pin extends at substantially the same angle as one nut thread flank, and the inner end of the locking pin has at least one thread flank which is substantially parallel to the longitudinal axis.

5 Claims, 2 Drawing Figures

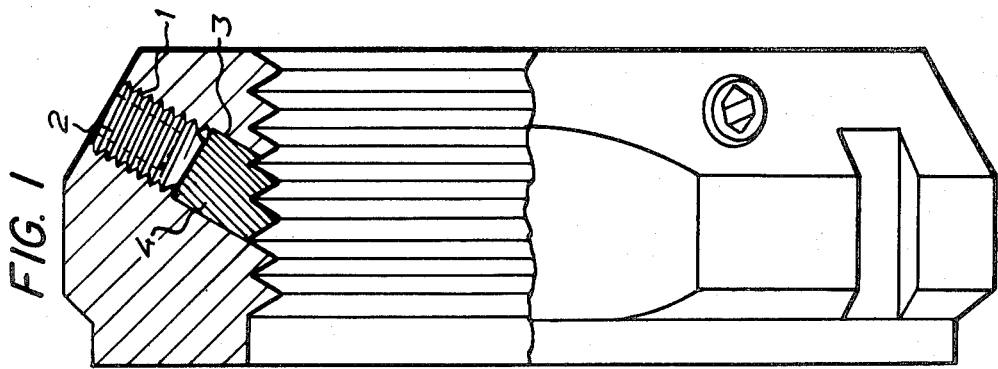
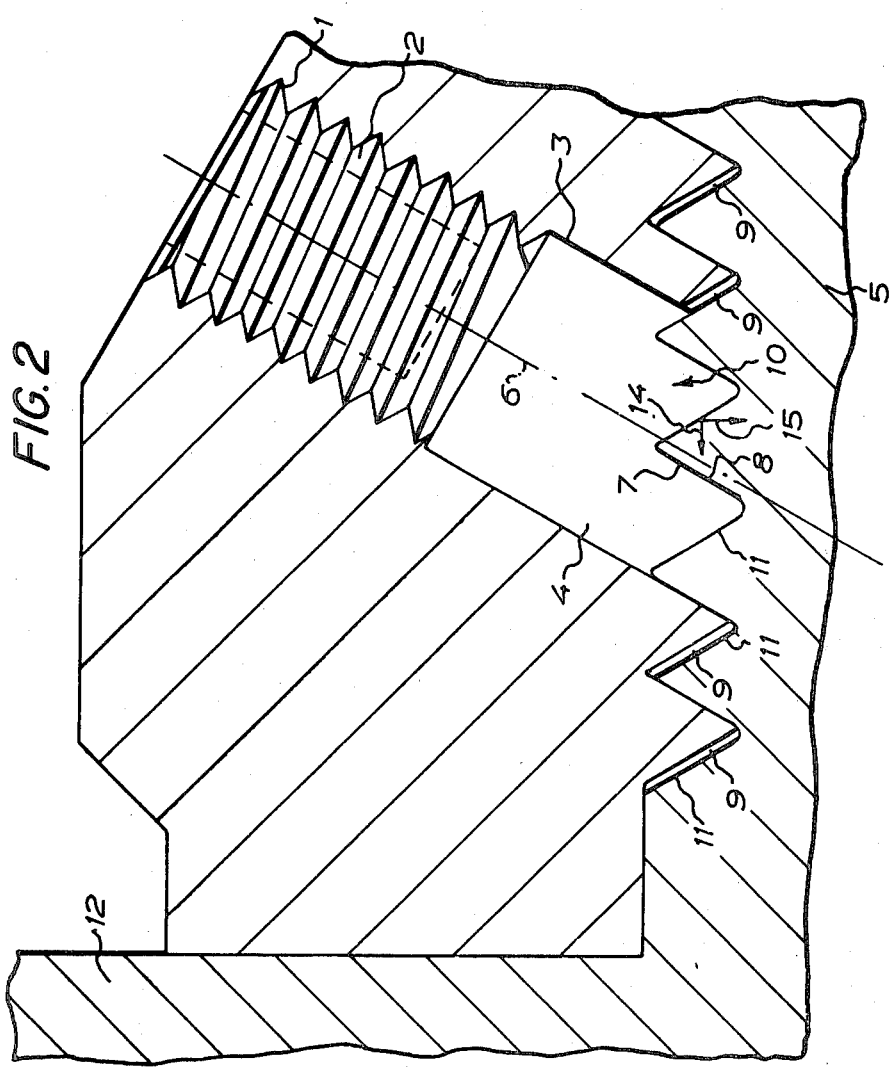

LOCK NUT

BACKGROUND OF THE INVENTION

The present invention relates to a lock nut in which a locking pin is disposed in an oblique bore in the nut for engagement of the inner end of the pin against a threaded portion on which the nut is to be mounted, the inner end of the locking pin having a shape which fits the thread of the threaded portion.

It has long been known in the art to lock nuts on threaded shafts by means of locking screws and it also known in the art to mount locking pins in nuts. One example of such an assembly is disclosed in U.S. Pat. No. 2,520,122 according to which a hole is drilled in the nut wall from the inside of the nut. For the purposes of the drilling, the axis of the drilling tool is to make a sufficiently large angle in relation to the plane of one end of the nut that the drilling tool can be inserted at an oblique angle in the nut. The pin inserted in the oblique blind bore will, as a result, incline at an oblique angle in relation to the geometric axis of the nut. This angle is determined by the size of the hole in the nut, that is to say the smaller the hole, the steeper the angle, and vice verse. A variation of this arrangement is described in U.S. Pat. No. 3,254,689.

U.S. Pat. No. 1,204,695 calls for the provision of the nuts with radial locking members which may consist of softer material than the bolt on which the nut is to be mounted, and probably softer than the nut material itself.

A common disadvantage inherent in all of these prior art lock nuts is that the locking pin does not provide effective locking which prevents bearing play or fixes the nut to allow a certain bearing play. A further disadvantage is that after repeated use of the nut, effective locking can no longer be obtained.

These prior art lock nuts satisfy at best the requirements for once-over use but deteriorate repidly in effectiveness and can at most be re-used a few times before they must be rejected because of the strict requirements which are now placed on lock nuts, dependng upon the facts that the inner ends of the locking pins are changed in shape and worn when the nut is tightened and that the locking pins cannot be reset correctly.

SUMMARY OF THE INVENTION

The object of the present invention is to provide a lock nut which, with substantially unchanged locking effect, can be used a great number of times. To this end, the lock nut according to the invention is characterized in that the common longitudinal axis of the bore and the locking pin extends at substantially the same angle as one nut thread flank, and that the inner end of the locking pin has at least one thread flank which is substantially parallel to the above-mentioned longitudinal axis.

Because the longitudinal axis of the locking pin and the axis of the nut make substantially the same angle in relation to each other as does a thread flank relative to the longitudinal axis of the nut, and because the inner end of the locking pin has thread flanks which are parallel to the thread flanks of the nut and of which at least one, or every other thread flank, is parallel to the axis of the pin and the bore, the important advantage will be realized that the pin end need not absorb the great axial pressure between the screw threads of the shaft and the nut but only the pressure force for providing a sufficient locking friction which prevents the nut from coming loose.

As a corollary to the above-mentioned advantage, the locking pin, which may be set in position by means of a grub screw once the nut is tightened, shows no tendency to shift the nut in relation to the threaded shaft. This is explained below in more detail.

A further advantage obtained from the present invention is that the locking pin may be reset, whereby re-usability of the lock nut according to the invention is restricted substantially only by wear on the nut itself.

In a preferred embodiment of the present invention, the inner end of the locking pin, after lodging of the locking pin in the bore is threaded by means of a threading tool for realizing the same thread dimension as for the thread in the nut, thereby ensuring in a simple manner that the thread flanks of the pin end are exactly parallel to the thread flanks of the nut, every second thread flank on the inner end of the pin being automatically exactly parallel to the common longitudinal axis of the pin and the bore.

It is advantageous to use a cylindrical locking pin which lacks outer threading and to insert this into an unthreaded inner portion of the oblique bore provided in the nut wall. According to the invention, the oblique bore in the nut wall consists, therefore, of a through-bore which comprises an outer threaded portion and an inner portion, of which the inner portion accommodates the locking pin and the outer portion accommodates an adjustment or grub screw which abuts against the outer end of the locking pin and by means of which the locking pin, after application of the nut to the threaded portion, may be brought into abutment against the thread of the threaded portion. This arrangement ensures that the locking pin may be set at the correct angular position without being exposed to great forces about its longitudinal axis. The grub screw may, in this instance, have the form of a threaded cylindrical pin with a pin hole in its outer end for a pin key, and the pin is, at least after application of the grub screw, located with its outer end flush with or inside the outer circumference of the nut.

For the grub screw and the nut, use can be made of conventional material such as steel, but preferably, the locking pin should consist of softer material, for example, brass or other metal which is softer than the material in the threaded portion.

The nature of the present invention and its aspects will be more readily understood from the following brief description of the accompanying drawing, and discussion relating thereto.

BRIEF DESCRIPTION OF THE DRAWINGS

In the accompanying drawings:

FIG. 1 shows, partially in axial section, a lock nut according to the invention; and FIG. 2 is an axial section of a portion of the nut of FIG. 1 on a much larger scale, and an abutting portion of a threaded shaft, as well as the locking pin which, with its threaded end, abuts against the screw thread of the shaft.

DETAILED DESCRIPTION OF THE INVENTION

A bore is provided in the lock nut shown in the drawings, the bore comprising a threaded outer portion 1 for an adjustment or grub screw 2 and a non-threaded inner portion 3 for a locking pin 4 which is in the form of a cylindrical pin and may consist of a material, for example, brass, which is softer than the threaded portion on which the nut is to be mounted.

The longitudinal axis of the bore consisting of the two portions 1 and 3 extends at an oblique angle with respect to the longitudinal axis of the nut. This angle agrees substantially with the inclination of one flank of the nut thread as is clearly apparent from FIG. 2.

According to the invention, the nut may be ready-threaded with its final threading before the bore is made and the locking pin 4 inserted. The locking pin is inserted such that it extends a short distance into the nut, and the locking pin end is then threaded by means of a threading tool fitting the nut thread. For locking the nut on a threaded shaft 5, the locking pin 4 is applied after tightening of the nut. The locking pin need not absorb axial pressure between the screw and the nut but should only provide sufficient friction to prevent unintentional turning of the nut. When the nut is to be loosened, the grub screw 2 should first be released in order to facilitate unscrewing of the nut without unnecessary wear on the threaded end of the locking pin 4.

When the lock nut according to the invention is to be used again and on many subsequent occasions, it will be just as effective as the first time it was used.

It will be understood that a lock nut according to the invention should be utilized such that the longitudinal axis 6 of the locking pin 4 is parallel to that thread flank which, on application of the nut to a threaded shaft, absorbs pressure, such as the nut thread flank 7 in FIG. 2 in abutment with the adjacent thread flank 8 of the threaded shaft or screw 5 in FIG. 2.

FIG. 2 illustrates, at 9, the clearance between the nut and screw thread flanks which, on application of the nut, are not exposed to pressure. As is similarly shown in FIG. 2, the locking pin 4 is set such that its threaded end 10 in the corresponding region fills these clearances 9 and is applied against the unloaded thread flanks 11 of the threaded shaft or screw 5. It follows that the application pressure (locking pressure) from the locking pin 4 acts in the same direction as the pressure from the screw on the nut (i.e. to the left in FIG. 2) and not against this direction.

In the case of a lock nut with a radial locking pin, the pin would, if it were applicable by means of a grub screw, act upon the thread flanks facing away from each other and could, on tight application, force the nut to move axially a distance corresponding to half of the thread clearance 9. On tightening of a radial pin, the pin thus tends to move the nut in a direction towards that surface towards which the nut is applied, but if the application pressure of the nut is already sufficient, the locking pin cannot, naturally, move the nut but is deformed instead. As a result, the locking pin can become warped and unusable for fulfilling its locking function.

If the locking pin is inclined in relation to the longitudinal axis of the nut, the above-described inconvenience is reduced, but not until the longitudinal axis of the locking pin is substantially parallel to the thread flank exposed to pressure on application, as is the case according to the invention, will the advantage be realized that the locking pin does not tend, on application, to shift the nut in order to distribute the thread clearance on either side of each respective thread crest. After application of the nut on a threaded shaft into abutment against a surface, such as the surface 12 in FIG. 1, the nut will not change its position on application of the locking pin, since the end of the pin 4 in the regions designated 10 in FIG. 2 exercises a pressure which acts, on the thread of the screw or shaft 5, with an axial component 14 directed at right angles to the surface 12 and with a purely radially directed component 15. In the region between these end portions 10, the end of the locking pin 4 does not exercise any radial or axial pressure against the thread of the shaft or screw 5.

The arrangement of the locking pin 4 according to the invention thus prevents the bearing clearance from being changed in that the locking pin 4 is applied after tightening of the nut with the desired force.

For locking a large nut, use can be made of, for example, three angularly equally distributed locking pins 4. The adjustment screw or each such screw may be in the form of a threaded pin with a base hole in its end which is square or hexagonal in section for a pin key. Thus, the adjustment screw 2 need neither be in the way of tools which are required for tightening and loosening of the nut nor of objects in assembly conditions which are spatially restricted.

What I claim and desire to secure by Letters Patent is:

1. A lock nut for attachment to an exteriorly threaded member, said lock nut comprising:
   a nut having a threaded axial opening adapted to be threaded onto an exteriorly threaded member;
   said nut having therein an oblique bore extending from said axial opening;
   a locking pin positioned in said oblique bore, said locking pin having an inner end which is shaped to fit within the threads of the exteriorly threaded member;
   said oblique bore and said locking pin having a common longitudinal axis extending at substantially the same angle to the longitudinal axis of said axial opening as does one of the thread flanks of the threads of said axial opening of said nut;
   said inner end of said locking pin having at least one thread flank extending substantially parallel to said common longitudinal axis; and
   said common longitudinal axis extending at an angle to a plane which is transverse to said longitudinal axis of said axial opening, and said common longitudinal axis lying on a plane which extends along said longitudinal axis of said axial opening.

2. A lock nut as recited in claim 1, wherein said inner end of said locking pin, after lodging of said locking pin in said bore, is threaded by means of a threading tool to have the same thread dimension as said threads of said axial opening of said nut.

3. A lock nut as recited in claim 1, wherein said oblique bore is a through-bore extending from said axial opening to the outer side of said nut, said through-bore including an outer threaded portion and an inner portion, said locking pin being within said inner portion, said outer portion accommodating therein an adjustment or grub screw which abuts against the outer end of said locking pin and by means of which said locking pin, after application of said nut to the exteriorly threaded member, may be brought into abutment against the threads of the exteriorly threaded member.

4. A lock nut as recited in claim 3, wherein said grub screw is in the form of a threaded cylindrical pin with a pin hole in its outer end for receipt of a pin key, and wherein said pin, at least after application of said grub screw, is located with its outer end flush with or inside the outer circumference of said nut.

5. A lock nut as recited in claim 4, wherein said locking pin is formed of a metal, for example brass, which is softer than the material of the exteriorly threaded member.

* * * * *